Oct. 21, 1958  A. J. KROECKEL ET AL  2,857,535
ADJUSTABLE WEIGHT VIBRATORY MOTOR
Filed April 5, 1957  2 Sheets-Sheet 1

INVENTORS
ALFRED J. KROECKEL
RUSSELL C. SMITH
BY

ATTORNEY

INVENTORS
ALFRED J. KROECKEL
RUSSELL C. SMITH
BY

ATTORNEY

United States Patent Office 2,857,535
Patented Oct. 21, 1958

2,857,535

ADJUSTABLE WEIGHT VIBRATORY MOTOR

Alfred J. Kroeckel, North Hollywood, and Russell C. Smith, La Crescenta, Calif., assignors to Viber Company, Burbank, Calif., a corporation of California Application April 5, 1957, Serial No. 650,978

8 Claims. (Cl. 310—81)

This invention relates to a vibratory motor of the eccentric weight type arranged for attachment to molds, bins, and the like, and in particular to a motor vibrator having a through-shaft which drives adjustable eccentric weights which are mounted on the vibrator housing on both ends of the motor.

One object of the invention is to provide a unitary electric motor driven rotary vibrator having adjustable eccentric weights mounted for rotation on both ends of the motor. Another object is to provide a rotary vibrator having eccentric weights of adjustable eccentricity disposed apart so that the character of the vibration may be altered over a wide range. Another object is to provide a double eccentric weight vibrator whose eccentric weights are separately adjustable as to eccentricity and orientation. A further object is to provide a novel means of mounting motor-shaft driven eccentric weights on the vibrator housing.

These and other objects are attained by our invention which will be understood from the following description, reference being made to the accompanying drawings in which.

Figure 1:
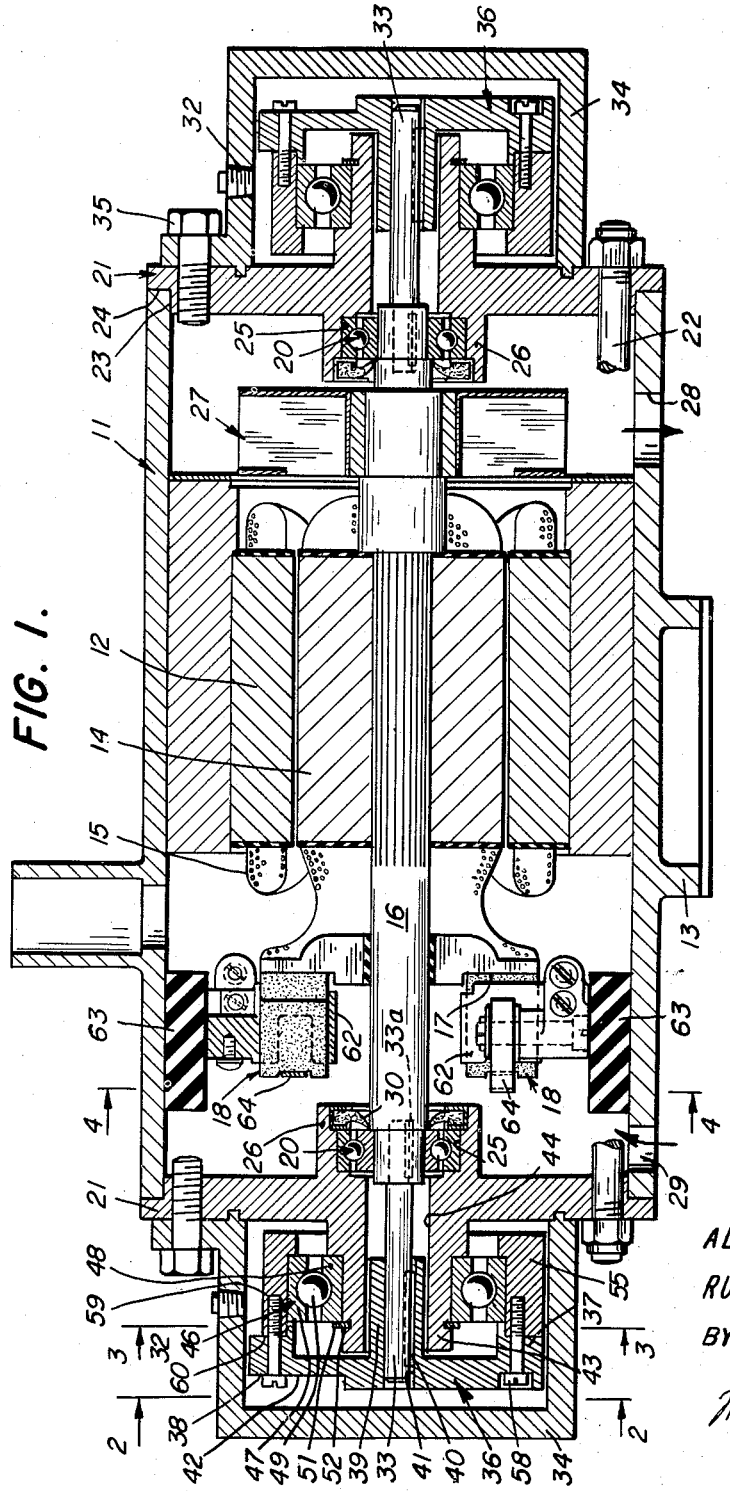
Fig. 1 is a longitudinal sectional view corresponding to section line 1—1 of Figs. 2 and 4.
Figure 2:
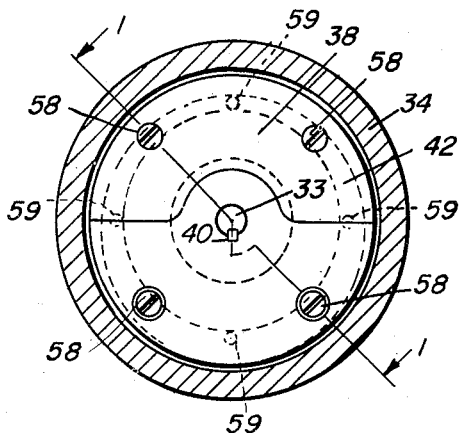
Fig. 2 is a cross-sectional view taken on the line 2—2 of Fig. 1.
Figure 3:
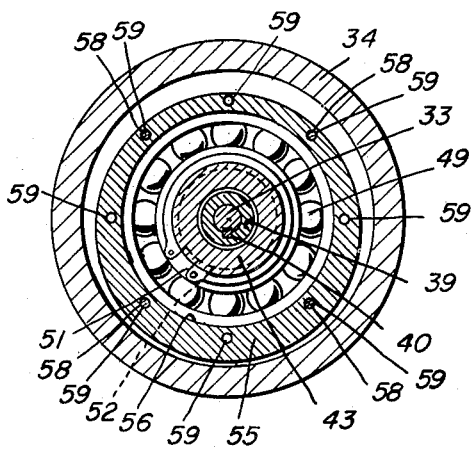
Fig. 3 is a cross-sectional view taken on the line 3—3 of Fig. 1.
Figure 4:
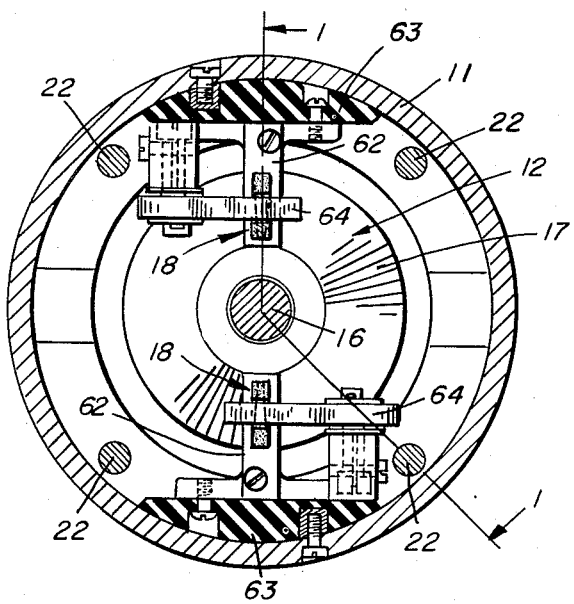
Fig. 4 is a cross-sectional view taken on the line 4—4 of Fig. 1.

Referring to the drawings showing the preferred form of the invention, our vibrator consists generally of a housing 11 having a mounting foot 13 within which is mounted a commutator-type motor 12 including an armature 14, field windings 15, a shaft 16, a vertical face commutator 17, and brush means 18, the latter means including the brush holder 62, the supporting bracket 63, and the spring means 64, mounted on the inside surface of the cylindrical housing. The shaft 16 is supported on shaft ball bearings 20 mounted in recesses 25 in the inwardly directed hubs 26 in the end plates 21, which plates are held in peripheral edge recesses 23 against the ends 24 of the cylindrical housing 11, by through-bolts 22. A fan 27 is mounted on the shaft 16 between the armature 14 and the shaft bearing 20 at one end of the motor for the circulation of cooling air through the motor windings, an outlet 28 being provided in the cylindrical housing 11 adjacent the fan 27, and an inlet 29 being provided in the cylindrical housing 11 on the opposite end of the motor. Sealings rings 30 are provided adjacent the shaft ball bearings 20 to prevent oil from leaking into the motor compartment of the housing. An extension shaft 33 is provided at each end of the shaft 16, being attached thereto by means of a key 33a. Attached to each of the extension shafts 33 is an adjustable cup-shaped eccentric weight member 36, each eccentric weight consisting of an outer shallow cylinder 37 having an end closure plate 38 which is provided with an inwardly directed central boss 39 having an axial hole 41 to receive the extension shaft 33 to which it is operatively held by a key 40. A hub 43 is provided extending outwardly from the end plate 21 of the housing 11, said hub having a central opening 44 into which the extension shaft 33 and the central boss 39 extend. The hub 43 on its outer cylindrical surface is arranged to receive and seat the inner race 48 of a ball bearing unit 46 including the outer race 47 and the balls 49, there being a holding ring 51 in a groove 52 to hold the inner race 48 in place. The outer race 47 is mounted inside an eccentrically weighted cylinder 55, which is attached in end-to-end relation to the outer shallow cylinder 37 by bolts 58 extending longitudinally through the outer cylinder 37 into threaded holes 59 spaced around the peripheral contacting face 60 of the cylinder 55. The cylinder 55 is provided with an opening 56 which is eccentric to the outer cylindrical surface so that one side of the cylinder is thick and heavy and the opposite side is relatively thin and light weight. The closure plate 38 of the outer shallow cylinder is cut away so that one portion 42 of it is about half the thickness of the other portion, thus providing eccentric weighting when rotated. The angular positioning and the magnitude of the eccentric weighting of each eccentric weight member 36 may be adjusted by the orientation of the end closure plate 38 relative to the eccentrically weighted cylinder 55, eight threaded holes 59 equally spaced angularly around the cylinder being provided. By selection of the relative positions of maximum unbalanced weight in the end closure plate 38 and the cylinder 55, the total out-of-balance weight of each weight member 36 may be adjusted with the bolts 58 and threaded holes 59 holding the unit in the selected orientation. Also, the angular disposition of the eccentric weights on either end of the motor determines whether the two eccentric weight units function at the same angular position, or are partly or totally opposed to each other. By these means of adjustment, first of the weight eccentricity of each of the weight members 36, and the angular orientation of the two weights, the character and magnitude of the vibrations produced when the weights are rotated may be selected.

The eccentric weight members 36 are enclosed between the end plates 21 and the end caps 34 which are attached to the end plates 21 by threaded bolts 35. A screw plugged opening 32 is provided in each end cap 34 for the introduction of lubricating oil.

The supporting of the eccentric weight units 37 on the cylindrical hubs 43, which are a part of the end plates 21, as distinguished from direct mounting of the eccentric weights directly on the shaft extensions 33, provides many advantages. The vibrations of the housing are produced directly, instead of through the shaft supporting bearings, for example shaft bearings 20. The principal advantage, however, is in the much longer wear of the ball bearings when mounted as in this invention. Mechanical vibrators operate at very high speeds, and replacement of worn out ball bearings, including balls, races and ball separators, is one of the major maintenance expenses. By more rigidly supporting the eccentric weight members directly on the housing itself, much of the wear of bearings because of the hammering action of the vibrations is avoided.

The many advantages of our invention will be apparent from the above description. Particularly, the adjustability of the two weights both as to relative orientation as well as amount of eccentricity permits the production of vibrations of many degrees of amplitude and frequency. The use of the vertical face commutator and associated brush mechanism prevents chattering of the brushes from the vibration and consequent sparking and burning of the commutator, as well as the loss of speed and power of the motor. By mounting the two eccentric weights at opposite angular positions, the frequency of vibration may be doubled, or by mounting them on the shaft with the same orientation, the eccentric weight may be doubled. Also, each weight may be readily adjusted for various degrees of eccentricity.

We claim:

1. A vibratory motor device comprising a cylindrical housing having end closures, each of said end closures having an outwardly directed axial hub; a motor means operatively mounted within said housing, said motor means including an elongated shaft and bearings for said shaft; an eccentric weight member mounted for rotation on a ball bearing supported on the outer face of each of said axial hubs on said end closures; and means for operatively connecting an end of said motor shaft with each of said weight members whereby to rotate said weight members around said axial hubs.

2. A vibratory motor comprising a cylindrical housing having end closures, each of said end closures having an outwardly directed axial hub; a motor means operatively mounted within said housing, said motor means including an elongated shaft and bearings for said shaft; a cup-shaped eccentric weight member mounted for rotation on its inner surface on a ball-bearing supported on the outer face of each of said axial hubs on said end closures; and shaft extensions connecting said motor shaft with each of said weight members whereby to rotate said weight members around said axial hubs.

3. A vibratory motor comprising a cylindrical housing having end closures, each of said end closures having an inwardly directed axial ball-bearing supporting boss; and an outwardly directed axial hub; a motor means operatively mounted within said housing, said motor means including field windings attached to the housing, a rotatable armature within said field windings, and a shaft to said armature extending in both directions to the end closures of said housing; ball bearing means for said motor shaft, said ball-bearing means being mounted in said supporting bosses of said housing; a cup-shaped eccentric weight member mounted for rotation on its inner surface on a ball-bearing supported on the outer face of each of said axial hubs on said end closures; and shaft extensions connecting an end of said motor shaft with each of said weight members whereby to rotate said weight members around said axial hubs.

4. A vibratory motor comprising a cylindrical housing having end closures, each of said end closures having an inwardly directed axial ball-bearing supporting boss; and an outwardly directed axial hub; a motor means operatively mounted within said housing, said motor means including field windings attached to the housing, a rotatable armature within said field windings, a shaft to said armature extending in both directions to the end closures of said housing, a vertical face commutator mounted on said shaft at one end of the armature, spring-pressed brush means mounted on the inside of said housing; ball bearing means for said motor shaft, said ball-bearing means being mounted in said supporting bosses of said housing; a cup-shaped eccentric weight member mounted for rotation on its inner surface on a ball-bearing supported on the outer face of each of said axial hubs on said end closures; shaft extensions connecting an end of said motor shaft with each of said weight members whereby to rotate said weights around axial hubs; and oil-retaining cap attached to each of said end closures and enclosing said eccentric weight members.

5. The vibratory motor defined in claim 1 in which the eccentric weight means are adjustable in effective eccentricity.

6. The vibratory motor defined in claim 3 in which each of the eccentric weight means comprises a shallow cylinder having an end closure, said end closure having an internal central boss with an axial hole arranged to be keyed to an extension shaft, said end closure being eccentrically weighted; an eccentrically weighted cylinder mounted in end-to-end relation to said closed end cylinder; and attachment means spaced around said cylinders whereby said eccentrically weighted cylinder may be selectively oriented relative to the eccentrically weighted shallow cylinder end closure.

7. In a vibratory motor having eccentric weights operatively connected to the ends of the motor shaft, adjustable eccentric weight means each comprising a shallow cylinder having an end closure, said end closure having an internal central boss arranged to be operatively connected to one end of the motor shaft, said end closure being eccentrically weighted; an eccentrically weighted cylinder mounted in end-to-end relation to said closed end cylinder; and means spaced around said cylinders whereby said eccentrically weighted cylinder may be selectively oriented relative to the eccentrically weighted shallow cylinder end closure.

8. In a vibratory motor having eccentric weights operatively connected to the ends of the motor shaft, adjustable eccentric weight means each comprising a shallow cylinder having an end closure, said end closure having an internal central boss with an axial hole arranged to be keyed to an extension of the motor shaft, said end closure being eccentrically weighted; an eccentrically weighted cylinder mounted in end-to-end relation to said closed end cylinder; and means spaced around said cylinders whereby said eccentrically weighted cylinder may be selectively oriented relative to the eccentrically weighted shallow cylinder end closure.

References Cited in the file of this patent

UNITED STATES PATENTS

| | | |
|---|---|---|
| 1,661,673 | Neal | Mar. 6, 1928 |
| 1,949,703 | Wettlaufer | Mar. 6, 1934 |
| 2,228,934 | Tjomsland | Jan. 14, 1941 |